(12) United States Patent
Begalke et al.

(10) Patent No.: US 7,804,778 B1
(45) Date of Patent: Sep. 28, 2010

(54) METHOD AND APPARATUS FOR MONITORING LINK DIVERSITY

(75) Inventors: John Begalke, Loveland, OH (US);
James Caldwell, DeMossville, KY (US); Debra Laxton, Cincinnati, OH (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1106 days.

(21) Appl. No.: 11/290,945

(22) Filed: Nov. 30, 2005

(51) Int. Cl.
*H04L 12/26* (2006.01)
*H04L 12/28* (2006.01)
*G06F 17/50* (2006.01)

(52) U.S. Cl. ............................ 370/234; 370/254; 716/2
(58) Field of Classification Search .................. 370/236, 370/254; 716/2
See application file for complete search history.

(56) References Cited

U.S. PATENT DOCUMENTS

| | | | | |
|---|---|---|---|---|
| 5,953,404 A | * | 9/1999 | Fikis et al. | 379/230 |
| 6,801,499 B1 | * | 10/2004 | Anandakumar et al. | 370/229 |
| 6,802,044 B2 | * | 10/2004 | Campbell et al. | 716/2 |
| 6,892,169 B1 | * | 5/2005 | Campbell et al. | 703/1 |

* cited by examiner

*Primary Examiner*—Curtis Kuntz
*Assistant Examiner*—Mohammad K Islam

(57) ABSTRACT

A method and apparatus for monitoring link diversity between two communication networks are disclosed. Physical diversity of communication links are important to guarantee service availability and reliability. Diversity monitoring can be achieved by using routing information of the communication links.

18 Claims, 5 Drawing Sheets

METHOD AND APPARATUS FOR MONITORING LINK DIVERSITY

The present invention relates generally to communication networks and, more particularly, to a method and apparatus for network interconnect Common Channel Signaling (CCS) D link diversity monitoring in communications network, e.g., Signaling System 7 (SS7) networks and Voice over Internet Protocol (VoIP) networks.

BACKGROUND OF THE INVENTION

To ensure overall voice service reliability and availability, CCS Diagonal (D) signaling link diversity must be established during installations and must also remain physically diverse regardless of the underlying network changes. Due to the many changes and rearrangements that occur almost daily in the optical fiber based transport network, on which these D links traverse, it is a necessity to keep track of where and how the signaling D links are routed in order to maintain the physical diversity. For instance, node A and node Z are interconnected via node W by a transport network using optical fibers. A D link may traverse the A to W to Z route. The network provider decides later that node A to Z will be interconnected directly instead of going through W due to a more efficient routing in the physical layer, such as the optical fiber level. Of course, when the A to Z physical layer routing is changed, the D link that originally rides on the A to W to Z route will also be moved to the A to Z direct route. The network provider must then evaluate if this change will violate the physical diversity requirements by checking if the new D link routing will cause the D link to be routed through the same physical conduits of other D links in the same quad D link group that must be diverse from the first D link. The D Link signaling network diversity is necessary to ensure that connectivity to other Local Exchange Carriers (LECs) or Inter Exchange Carriers (IXCs) have adequate redundancy so that even in multiple link failure conditions, Common Channel Signaling (CCS) System 7, also known as SS7, signaling between voice networks will be uninterrupted. With the introduction of new VoIP related network elements that perform SS7 related signaling functions, the D link diversity issue between a VoIP network and an SS7 network must also be addressed.

Therefore, a need exists for a method and apparatus for network interconnect Common Channel Signaling (CCS) D link diversity monitoring between SS7 and VoIP networks.

SUMMARY OF THE INVENTION

In one embodiment, the present invention enables the monitoring of the three-way inter-office physical path diversity that is required for a network provider's Diagonal (D) signaling links connecting the LEC or IXC STPs (Signaling Transfer Points) to the network provider's SGBEs (Signaling Gateway Border Elements) that are used to support VoIP services. Physical diversity of D links used between SGBEs and the LEC STPs or other IXC STPs are important to guarantee voice service availability and reliability. In one embodiment, diversity monitoring can be achieved by using the physical routing information of the D links. For example, the lowest level of the physical routing information is the Span level in which physical diversity information and significance reside. By comparing Span level information of two different paths with the same endpoints, a network provider can determine whether the two paths are indeed physically diverse. Using Span level information, a network provider not only can build physically diverse SS7 D links between SGBEs and other network provider's STPs, the network provider can also anticipate upcoming underlying transport network changes or reconfigurations to detect if D link diversity violations may result from these future network changes. If potential violations are detected ahead of time, the network provider can ensure D links to be appropriately reconfigured or rerouted to maintain the required physical diversity.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
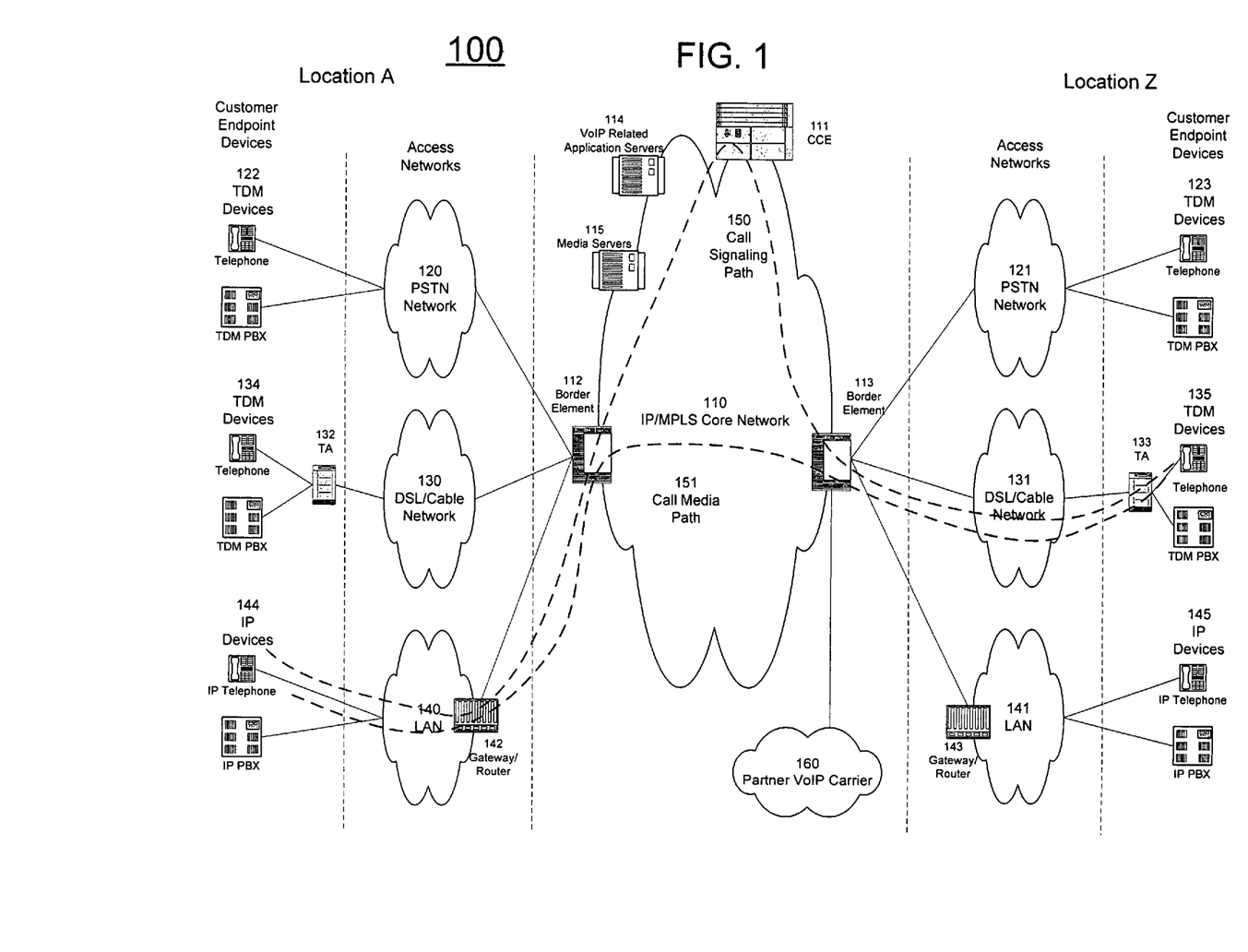
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

To ensure overall voice service reliability and availability, CCS Diagonal (D) signaling link diversity must be established during installations and must also remain physically diverse regardless of the underlying network changes. Due to the many changes and rearrangements that occur almost daily in the optical fiber based transport network, on which these D links traverse, it is a necessity to keep track of where and how the signaling D links are routed in order to maintain the physical diversity.

To address this criticality, the present invention enables the monitoring of the three-way inter-office physical path diversity required for a network provider's Diagonal (D) signaling links connecting the LEC or IXC STPs (Signaling Transfer Points) to the network provider's SGBEs (Signaling Gateway Border Elements) that are used to support VoIP services. In one embodiment, a D link connects a secondary (e.g., local or regional) STP mated pair to a primary (e.g., inter-network gateway) STP mated pair in a quad-link configuration, known as the quad D link group. Signaling traffic between signaling points is routed via an STP. An STP routes each incoming message to an outgoing signaling link based on routing information contained in the SS7 signaling message.

In one embodiment, an SGBE is a network element that serves as an interface between a VoIP network and a SS7 signaling network and it typically performs SS7 to VoIP signaling protocol, such as Session Initiation Protocol (SIP), conversion. Each LEC (Local Exchange Carrier) or IXC (Inter Exchange Carrier) is connected to the ATT SS7 network utilizing D links. These D links direct long distance traffic. SGBEs are new network elements that will be used in a network provider's network to enable the support of VoIP (Voice over Internet Protocol) services. Physical diversity of D links used between SGBEs and LEC STPs or other IXC STPs are important to guarantee voice service availability and reliability.

In one embodiment, diversity monitoring can be achieved by using the physical routing information of the D links. The lowest level of the physical routing information is the Span level in which physical diversity information and significance reside. By comparing Span level information of two different paths with the same endpoints, a network provider can determine whether the two paths are indeed physically diverse. Using Span level information, a network provider not only can build physically diverse SS7 D links between SGBEs and other network provider's STPs, the network provider can also anticipate upcoming underlying transport network changes or reconfigurations to detect if D link diversity violations may result from these future network changes. If potential violations are detected ahead of time, the network provider can ensure D links to be appropriately reconfigured or rerouted to maintain the required physical diversity.

Figure 2:
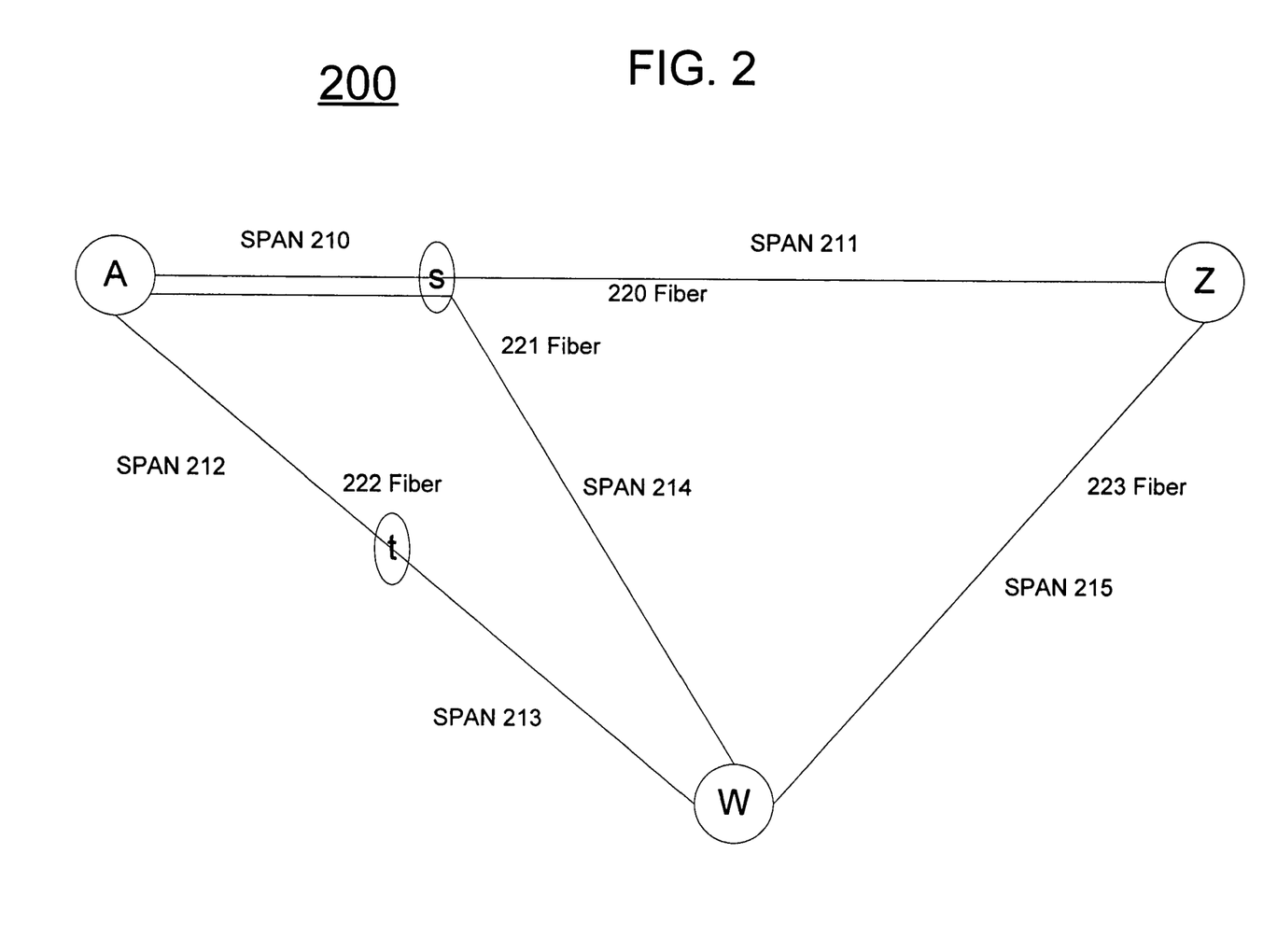
FIG. 2 illustrates an exemplary optical fiber transport network using SPAN information to describe physical diversity related to the present invention.

FIG. 2 illustrates an exemplary optical fiber transport network 200 using SPAN information to describe physical diversity related to the present invention. In FIG. 2, Nodes A, Z, and W are network nodes or central offices. Optical fibers are physically accessible in nodes A, Z, and W. Location s and t are optical fiber access points in the network, such as a manhole location underground. These optical fiber access points provide physical access to maintenance crews to optical fibers buried and routed underground and these access points do not serve the full blown functions of a central office that contain multiple types of network equipment. They are merely a place to physically access the underground optical fibers when necessary to perform manual repair functions.

In one embodiment, a SPAN is a conduit in which optical fibers can be routed between two adjacent locations having access to these optical fibers. For instance, SPAN 210 is between node A to access point s; SPAN 211 is between access point s and node Z; SPAN 212 is between node A and access point t; SPAN 213 is between access point t and node W; SPAN 214 is between access point s and node W; and SPAN 215 is between node W to node Z. Fiber 220 interconnects between node A and node Z and its physical routing contains SPAN 210 and SPAN 211. Fiber 221 interconnects between node A and node W and its physical routing contains SPAN 210 and SPAN 214. Fiber 222 interconnects between node A and node W and its physical routing contains SPAN 212 and SPAN 213. Fiber 223 interconnects between node W and node Z and its physical routing contains SPAN 215.

In FIG. 2, there are three different routes to interconnect A and Z. One route is to go from A to Z directly using Fiber 220. The second route is to go from A to Z via W using Fiber 221 and Fiber 223. The third route is to go from A to Z via W using Fiber 222 and Fiber 223. The first and second routes are actually not physically diverse, since they share a common SPAN 210. Therefore, if SPAN 210 is physically damage, such as by a construction crew digging in the ground, both the first and second routes will be disrupted at the same time. On the other hand, the first and third routes are physically diverse because the two routes share no common SPAN at all. Using SPAN information to describe optical fiber routing, physical routing significance and diversity can be compared.

Figure 3:
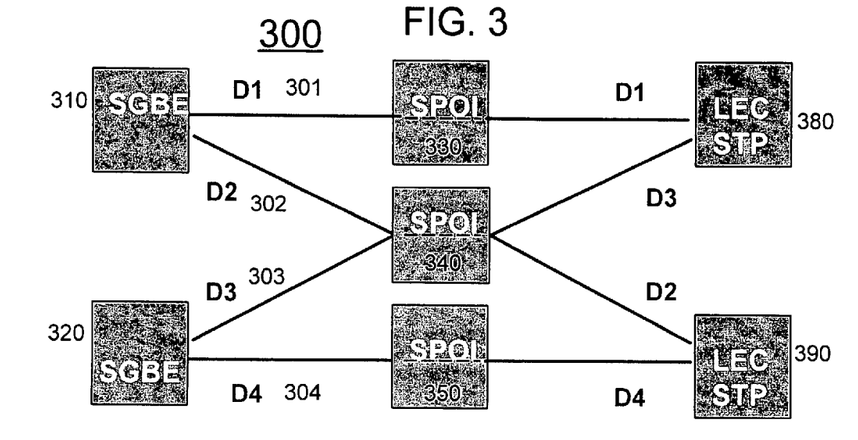
FIG. 3 illustrates the triple Signaling Point of Interface (SPOI) configuration of D link connectivity of the present invention.

FIG. 3 illustrates a triple Signaling Point of Interface (SPOI) configuration 300 of D link connectivity of the present invention. A SPOI is a patch panel where signaling links, such as D links, from two different providers' networks meet. A SPOI is the demarcation point of signaling between two networks. In FIG. 3, a mated pair of SGBEs 310 and 320 are to be connected to a mated pair of STPs 380 and 390 owned by a LEC. D link 301, e.g., D1, connects SGBE 310 to STP 380 via SPOI 330. D link 302, e.g., D2, connects SGBE 310 to STP 390 via SPOI 340. D link 303, e.g., D3, connects SGBE 320 to STP 380 via SPOI 340. D link 304, e.g., D4, connects SGBE 320 to STP 390 via SPOI 350. The three SPOIs, 330, 340, and 350, can potentially be located in different central offices for redundancy, diversity, and reliability purposes.

Physical diversity from the SGBEs mated pair 310 and 320 to the three SPOIs must be guaranteed to ensure D link network survivability. In one embodiment, the following conditions must be met to ensure the required D link diversity:

D link 301 must be physically diverse from D link 302; and
D link 303 must be physically diverse from D link 304; and
D link 301 must be physically diverse from D link 303; and
D link 302 must be physically diverse from D link 304; and
D link 301 must be physically diverse from D link 304 or D link 302 must be physically diverse from D link 303.

Figure 4:
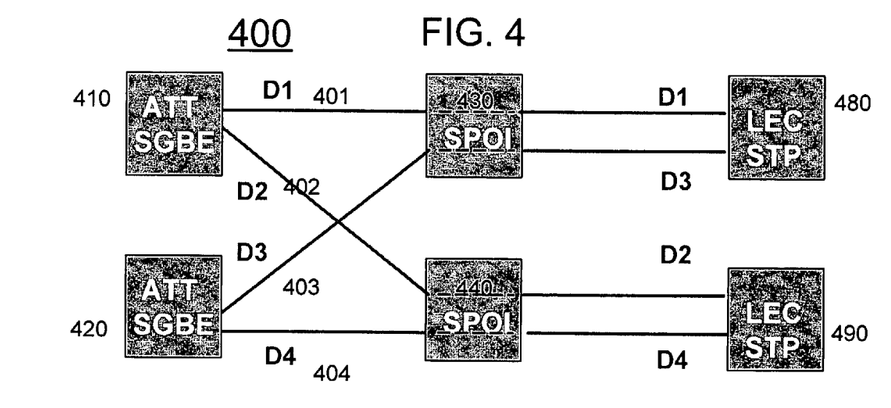
FIG. 4 illustrates the dual SPOI configuration of D link connectivity of the present invention.

FIG. 4 illustrates the dual SPOI configuration 400 of D link connectivity of the present invention. In FIG. 4, a mated pair of SGBEs 410 and 420 are to be connected to a mated pair of STPs 480 and 490 owned by a LEC. D link 401, e.g., D1, connects SGBE 410 to STP 480 via SPOI 430. D link 402, e.g., D2, connects SGBE 410 to STP 490 via SPOI 440. D link 403, e.g., D3, connects SGBE 420 to STP 480 via SPOI 430. D link 404, e.g., D4, connects SGBE 420 to STP 490 via SPOI 440. The dual SPOIs, 430, and 440, are located in different central offices for redundancy and reliability purposes. Physical diversity from the SGBE mated pairs 410 and 420 to the dual SPOIs must be guaranteed to ensure D link network survivability. The following conditions must be met to ensure the required D link diversity:

D link 401 must be physically diverse from D link 402; and
D link 403 must be physically diverse from D link 404; and
D link 401 must be physically diverse from D link 403; and
D link 402 must be physically diverse from D link 404; and
D link 401 must be physically diverse from D link 404 or D link 402 must be physically diverse from D link 403.

Figure 5:
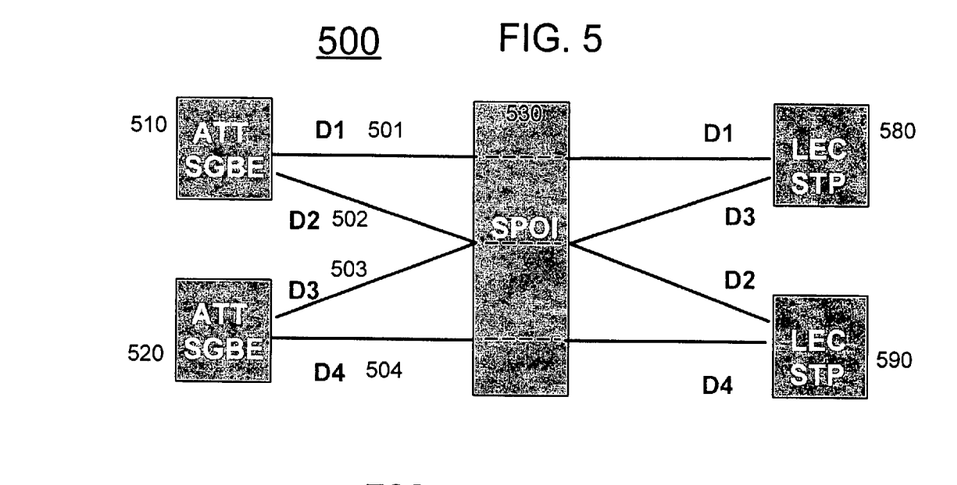
FIG. 5 illustrates the single SPOI configuration of D link connectivity of the present invention.

FIG. 5 illustrates the single SPOI configuration of D link connectivity of the present invention. In FIG. 5, a mated pair of SGBEs 510 and 520 are to be connected to a mated pair of STPs 580 and 590 owned by a LEC. D link 501, e.g., D1, connects SGBE 510 to STP 580 via SPOI 530. D link 502, e.g., D2, connects SGBE 510 to STP 590 via SPOI 530. D link 503, e.g., D3, connects SGBE 520 to STP 580 via SPOI 530. D link 504, e.g., D4, connects SGBE 520 to STP 590 via SPOI 530. Physical diversity from the SGBE mated pairs 510 and 520 to the single SPOI 530 must be guaranteed to ensure D link network survivability. The following conditions must be met to ensure the required D link diversity:

D link 501 must be physically diverse from D link 502; and
D link 503 must be physically diverse from D link 504; and
D link 501 must be physically diverse from D link 503; and
D link 502 must be physically diverse from D link 504; and
D link 501 must be physically diverse from D link 504 or D link 502 must be physically diverse from D link 503.

The key to knowing physical lever diversity is the Span level information. A SPAN file comprises a detailed analysis of how a transport system (e.g., light guide fiber) is physically routed between repeaters or manholes. For example, if two separate fibers are routed between the same two manholes using the same conduit, then they would both be assigned the same span number. With both fibers having the same span number, they would show up as a diversity violation. Once the D links are established in the network as diverse, weekly reports can be pulled from a database to anticipate future potential D link diversity problems. These reports can look ahead, e.g., three months in advance, to determine if any future planned changes, reconfigurations, or rearrangements will cause a diversity compromise. These reports will be compared with the previous weeks report for any new diversity compromises. If a new diversity compromise is found, then an analysis will be performed to find a new diverse route.

Figure 6:
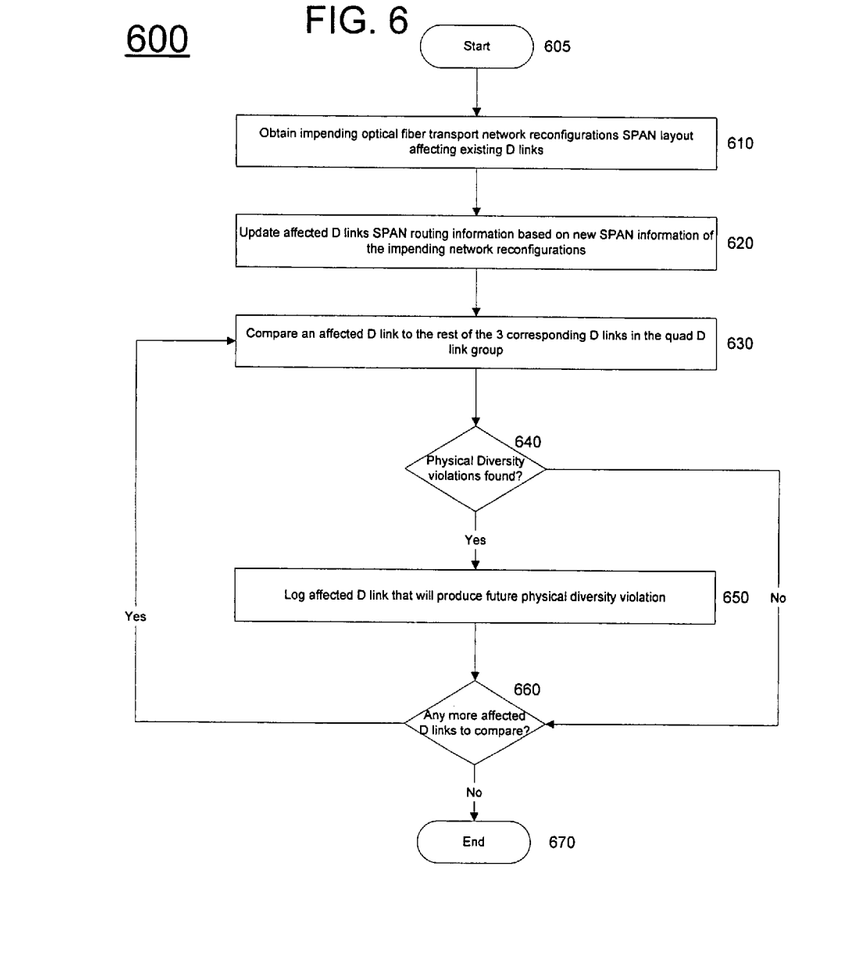
FIG. 6 illustrates a flowchart of a method for checking D link physical diversity violations due to impending transport network reconfigurations of the present invention.

FIG. 6 illustrates a flowchart of an exemplary method 600 for checking D link physical diversity violations due to impending transport network reconfigurations. Method 600 starts in step 605 and proceeds to step 610.

In step 610, the method obtains the impending optical fiber transport network reconfigurations SPAN layout and identify existing D links that will be affected by such reconfigurations.

In step 620, the method updates affected D links SPAN routing information based on the new SPAN information of the impending network reconfigurations.

In step 630, the method compares an affected D link to the rest of the three corresponding D links in the quad D link group to identify physical diversity violations.

In step 640, the method checks if physical diversity violations are found. If physical diversity violations are found, the method proceeds to step 650; otherwise, the method proceeds to step 660.

In step 650, the method records the affected D link that will produce future physical diversity violations in a report log file.

In step 660, the method checks if there are any more affected D links to be checked for physical diversity violations. If there are more D links to be checked, the method proceeds back to step 630; otherwise, the method proceeds to step 670. The method ends in step 670.

Figure 7:
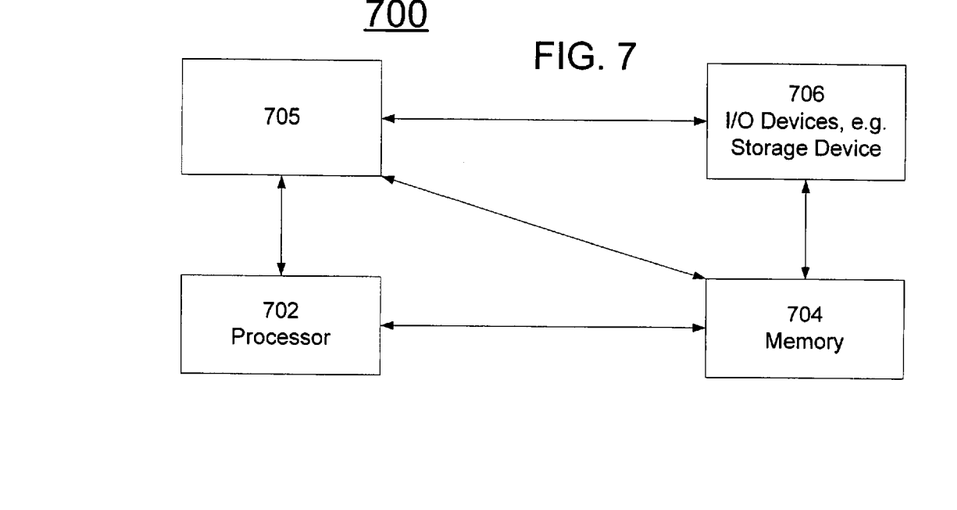
FIG. 7 illustrates a high level block diagram of a general purpose computer suitable for use in performing the functions described herein.

FIG. 7 depicts a high level block diagram of a general purpose computer suitable for use in performing the functions described herein. As depicted in FIG. 7, the system 700 comprises a processor element 702 (e.g., a CPU), a memory 704, e.g., random access memory (RAM) and/or read only memory (ROM), a link diversity monitoring module 705, and various input/output devices 706 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present link diversity monitoring module or process 705 can be loaded into memory 704 and executed by processor 702 to implement the functions as discussed above. As such, the present link diversity monitoring process 705 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for monitoring link diversity between two communication networks, comprising:
    assigning span information to each of a plurality of links, where said plurality of links forms a link group;
    comparing a first path of at least one link of said plurality of links to a second path of another link of said plurality of links; and
    determining a physical diversity violation pertaining to said link group has occurred if said first path of said at least one link of said plurality of links and said second path of said another link of said plurality of links share a common span wherein said two communication networks comprise a Voice-over-internet-protocol (VoIP) network and a Common Channel Signaling System 7 (SS7) network.

2. The method of claim 1, further comprising:
    reconfiguring said plurality of links in said link group to remove said physical diversity violation.

3. The method of claim 1, wherein said plurality of links comprises a plurality of SS7 D links and said link group is a quad D link group.

4. The method of claim 3, wherein said quad D link group is used for connecting a mated pair of VoIP Signaling Gateway Border Elements (SGBEs) to a mated pair of Signaling Transfer Points (STPs).

5. The method of claim 4, wherein said VoIP Signaling Gateway Border Elements are operated by a VoIP service provider and said Signaling Transfer Points are operated by a Local Exchange Carrier (LEC) or an Inter-Exchange Carrier (IXC).

6. The method of claim 4, wherein said SGBEs and STPs are connected via one or more Signaling Point of Interfaces (SPOIs).

7. The method of claim 4, wherein said quad D link group comprises:
    a first link connecting a first SGBE of said SGBE mated pair to a first STP of said STP mated pair;
    a second link connecting said first SGBE of said SGBE mated pair to a second STP of said STP mated pair;
    a third link connecting a second SGBE of said SGBE mated pair to said first STP of said STP mated pair; and
    a fourth link connecting said second SGBE of said SGBE mated pair to said second STP of said STP mated pair.

8. The method of claim 7, wherein said using comprises:
    determining if said first link and said second link share a common span; and
    determining if said third link and said fourth link share a common span; and
    determining if said first link and said third link share a common span; and
    determining if said second link and said fourth link share a common span; and
    determining if said first link and said fourth link share a common span or determining if said second link and said third link share a common span.

9. The method of claim 1, wherein said span information represents a conduit in which one or more optical fibers are routed between two adjacent locations having access to said optical fibers.

10. A computer-readable medium having stored thereon a plurality of instructions, the plurality of instructions including instructions which, when executed by a processor, cause the processor to perform the steps of a method for monitoring link diversity between two communication networks, comprising:
    assigning span information to each of a plurality of links, where said plurality of links forms a link group; and
    comparing a first path of at least one link of said plurality of links to a second path of another link of said plurality of links; and
    determining a physical diversity violation pertaining to said link group has occurred if said first path of said at least one link of said plurality of links and said second path of said another link of said plurality of links share a common span wherein said two communication networks comprise a Voice-over-internet-protocol (VoIP) network and a Common Channel Signaling System 7 (SS7) network.

11. The computer-readable medium of claim 10, further comprising:
reconfiguring said plurality of links in said link group to remove said physical diversity violation.

12. The computer-readable medium of claim 10, wherein said plurality of links comprises a plurality of SS7 D links and said link group is a quad D link group.

13. The computer-readable medium of claim 12, wherein said quad D link group is used for connecting a mated pair of VoIP Signaling Gateway Border Elements (SGBEs) to a mated pair of Signaling Transfer Points (STPs).

14. The computer-readable medium of claim 13, wherein said VoIP Signaling Gateway Border Elements are operated by a VoIP service provider and said Signaling Transfer Points are operated by a Local Exchange Carrier (LEC) or an Inter-Exchange Carrier (IXC).

15. The computer-readable medium of claim 13, wherein said SGBEs and STPs are connected via one or more Signaling Point of Interfaces (SPOIs).

16. The computer-readable medium of claim 13, wherein said quad D link group comprises:
a first link connecting a first SGBE of said SGBE mated pair to a first STP of said STP mated pair;
a second link connecting said first SGBE of said SGBE mated pair to a second STP of said STP mated pair;
a third link connecting a second SGBE of said SGBE mated pair to said first STP of said STP mated pair; and
a fourth link connecting said second SGBE of said SGBE mated pair to said second STP of said STP mated pair.

17. The computer-readable medium of claim 10, wherein said span information represents a conduit in which one or more optical fibers are routed between two adjacent locations having access to said optical fibers.

18. An apparatus for monitoring link diversity between two communication networks, comprising:
means for assigning span information to each of a plurality of links, where said plurality of links forms a link group; and
means for comparing a first path of at least one link of said plurality of links to a second path of another link of said plurality of links; and
means for determining if a physical diversity violation pertaining to said link group has occurred if said first path of said at least one link of said plurality of links and said second path of said another link of said plurality of links share a common span wherein said two communication networks comprise a Voice-over-internet-protocol (VoIP) network and a Common Channel Signaling System 7 (SS7) network.

* * * * *